United States Patent [19]
Neri et al.

[11] Patent Number: 5,335,951
[45] Date of Patent: Aug. 9, 1994

[54] SHOCK-ABSORBING SAFETY DEVICE FOR SELF-PROPELLED TRUCKS AND THE LIKE

[75] Inventors: Armando Neri, Bologna; Verter Cesari, Granarolo Emilia; Orlando Roveri, Zola Predosa; Alberto Manservigi, Bologna, all of Italy

[73] Assignee: G.D S.p.A., Bologna, Italy

[21] Appl. No.: 8,439

[22] Filed: Jan. 25, 1993

[30] Foreign Application Priority Data

Jan. 31, 1992 [IT] Italy ................ B092 A 000028

[51] Int. Cl.⁵ ............... B60R 19/38; B60R 19/42; B60T 7/22
[52] U.S. Cl. ..................... 293/118; 293/2; 293/4; 293/127; 180/279
[58] Field of Search .......... 293/2, 4, 5, 9, 21, 293/22, 24, 25, 118, 119, 126, 127, 128, 131; 180/274, 275, 276, 277, 278, 279, 280

[56] References Cited

U.S. PATENT DOCUMENTS

| | | | |
|---|---|---|---|
| 4,596,412 | 6/1986 | Everett | 293/4 |
| 5,004,281 | 4/1991 | Yamazaki | 293/128 X |

FOREIGN PATENT DOCUMENTS

| | | | |
|---|---|---|---|
| 2316164 | 10/1974 | Fed. Rep. of Germany | 293/127 |
| 0707627 | 4/1954 | United Kingdom . | |
| 0719002 | 11/1954 | United Kingdom . | |
| 1242560 | 8/1971 | United Kingdom . | |
| 1298540 | 12/1972 | United Kingdom . | |
| 2122001 | 1/1984 | United Kingdom . | |

*Primary Examiner*—David M. Mitchell
*Assistant Examiner*—Andrew C. Pike
*Attorney, Agent, or Firm*—Guido Modiano; Albert Josif; Daniel O'Byrne

[57] ABSTRACT

The shock-absorbing safety device has lateral protection elements which extend along the sides of a truck. Actuation devices move the lateral protection elements transversely with respect to the truck between a loading position, in which the lateral protection elements are adjacent to the sides of the truck, and a transport position in which the lateral protection elements are spaced therefrom. End protection elements provide, in the transport position, substantial continuity with the lateral protection elements, and control devices detect any collisions transmitted by the lateral protection elements and the end protection elements.

13 Claims, 3 Drawing Sheets

SHOCK-ABSORBING SAFETY DEVICE FOR SELF-PROPELLED TRUCKS AND THE LIKE

BACKGROUND OF THE INVENTION

The present invention relates to a shock-absorbing safety device for self-propelled trucks and the like.

The use of self-propelled trucks, elevators, and other similar vehicles assigned to load transportation inside industrial buildings is known. In particular, said trucks are provided with lifting elements by means of which they lift the loads to be transported, for example containers in which the products are stacked.

Appropriate safety devices, meant to stop the vehicle in case of collisions against any obstacles, are generally applied to said trucks. Conventional safety devices are constituted by bumpers which are mounted at the front and/or at the rear of the vehicle and can move in contrast with elastic means, so as to actuate suitable control devices in case of collision.

Said devices therefore meet safety requirements only partially, since obviously they are unable to detect the presence of obstacles located laterally to the truck, which might be struck for example during movements along curves and the like.

SUMMARY OF THE INVENTION

The aim of the present invention is to provide a safety device which is capable .of detecting any collisions to which self-propelled trucks and the like are subjected on all sides.

A further object of the present invention is to provide a shock-absorbing safety device which is simple in concept, safely reliable in operation, and versatile in use.

According to the present invention, a shock-absorbing safety device for self-propelled trucks and the like is provided, characterized in that it comprises: lateral protection elements which extend along the sides of the truck; actuation means for moving said lateral protection elements transversely with respect to said truck between a loading position whereat said lateral protection elements are arranged adjacent to the sides of the truck, and a transport position whereat said lateral protection elements are spaced therefrom; end protection elements for providing, in said transport position, substantial continuity with said lateral protection elements; and control means for detecting any collisions transmitted by said lateral protection elements and said end protection elements.

BRIEF DESCRIPTION OF THE DRAWINGS

The invention is now described with reference to the accompanying drawings, which illustrate some non-limitative examples of embodiment thereof, wherein.

DESCRIPTION OF THE PREFERRED EMBODIMENTS

Figure 1:
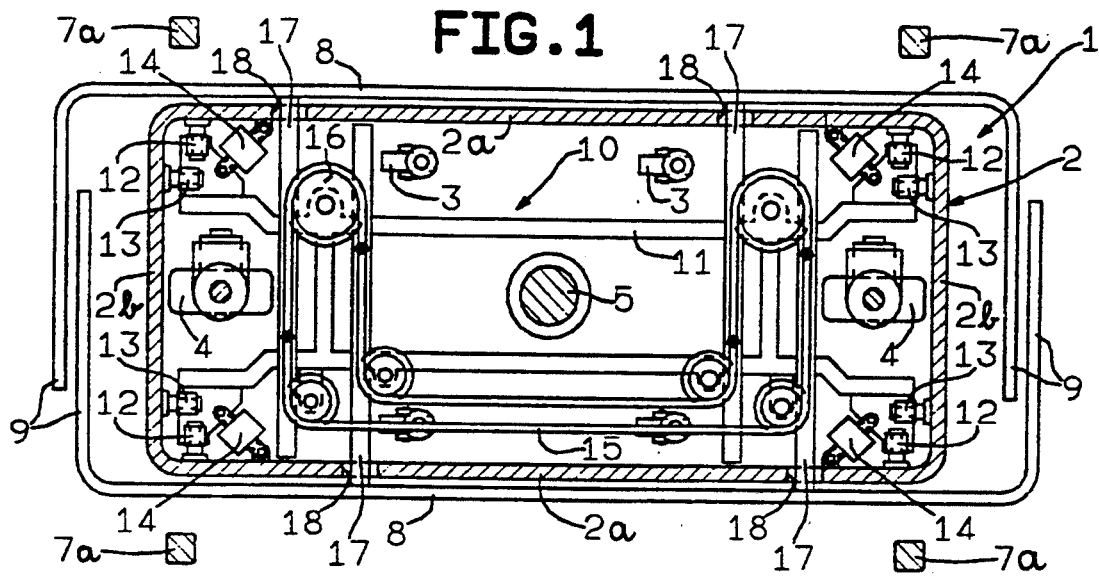
FIG. 1 is a horizontal sectional view of a truck provided with the safety device according to the invention, in the loading position.

With particular reference to the above figures, the reference numeral 1 designates a known self-propelled truck, equipped with the shock-absorbing safety device according to the invention. The truck 1 is provided with a chassis 2 which is mounted on self-orientating wheels 3 and is provided, at its front and rear ends, with self-steering driving wheels 4.

The truck 1 is centrally provided with actuation means 5 which are meant to actuate the vertical movement of a platform 6 which supports the load, for example a container 7 provided with downward feet 7a.

Figure 2:
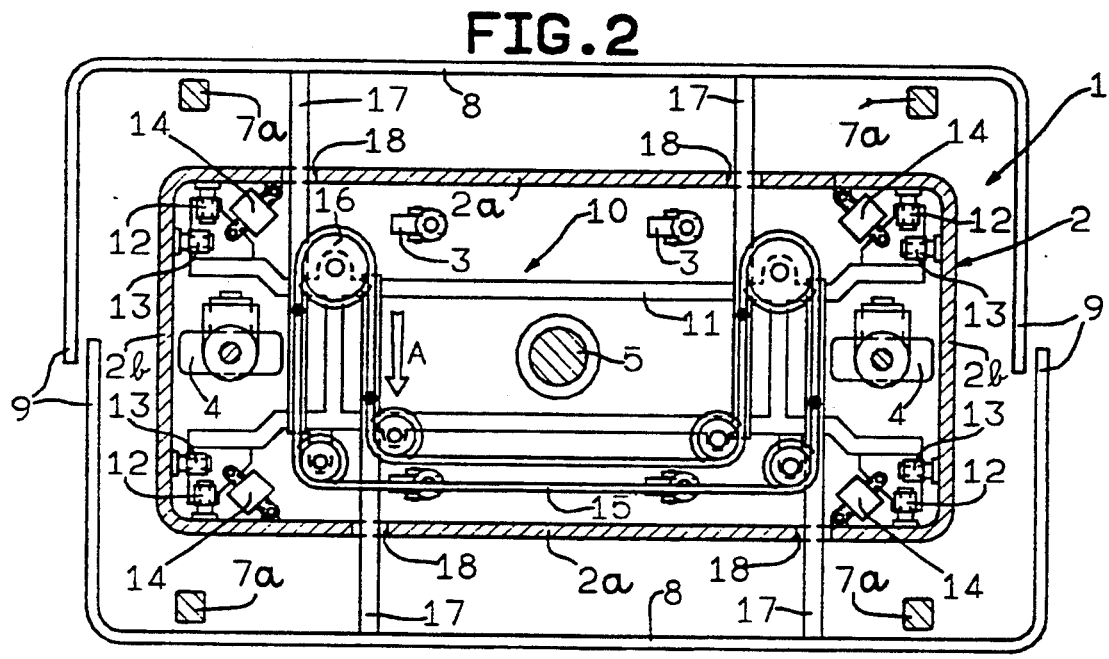
FIG. 2 is a corresponding sectional view of the truck of FIG. 1 in the transport position.
Figure 3:
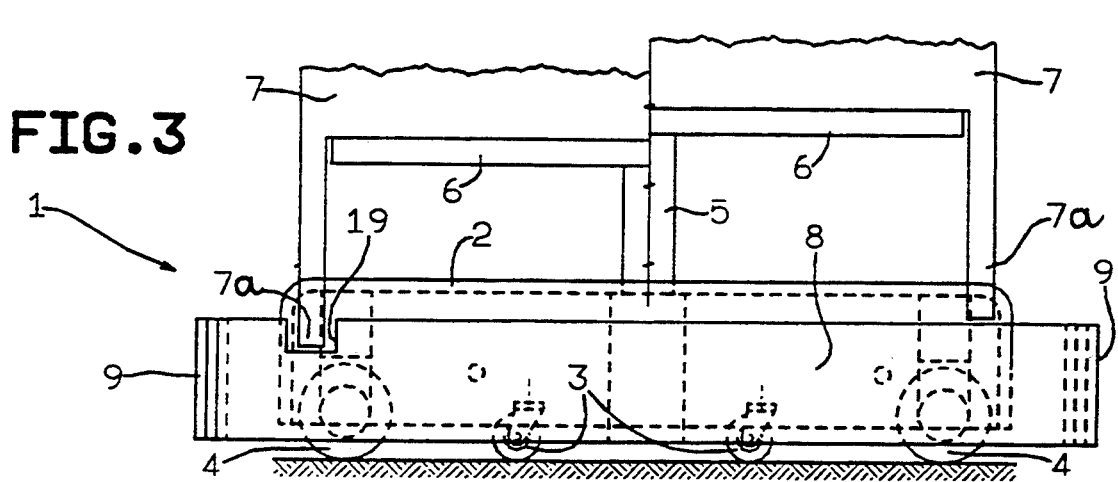
FIG. 3 is a side view of the truck of FIG. 1.

The safety device illustrated in FIGS. 1, 2, and 3 is provided with a pair of lateral protection elements 8 which are constituted by respective bumpers 8 which extend along the sides 2a of the truck; said bumpers have a longitudinal extension which is longer than the chassis 2 of the truck, so that the ends of the .bumpers 8 protrude from the chassis 2. The bumpers 8 are provided, at their ends, with respective portions 9 which are folded at right angles toward the median axis of the truck, so as to define respective front-end and rear-end protections. It should be noted that the facing bumpers 8 are constituted by elements having the same shape, for the sake of greater economy in production, and are arranged so that they are slightly offset in a longitudinal direction, so as to avoid interference between the respective end portions 9.

The bumpers 8 can move transversely with respect to the chassis 2 of the truck, so as to move between a loading position and a transport position, shown in FIGS. 1 and 2 respectively. More precisely, in the loading position the bumpers 8 are adjacent to the sides 2a of the truck, whereas in the transport position they are appropriately spaced.

Correspondingly, in the loading position the end protections 9 partially overlap one another, whereas in the transport position the ends of said end protections 9 are contiguous. Essentially, in the transport position the lateral bumpers 8, with their respective end portions 9, form a sort of ring which completely surrounds the truck 1.

The translatory motion of the bumpers 8 between said positions is produced by actuation means 10 which are supported by a frame 11 arranged inside the chassis 2 of the truck. The frame 11 is supported by respective pairs of rollers 12 and 13 at the corners of the truck 1, so that it can perform limited strokes both longitudinally and transversely with respect to said truck. At said corners, the frame 11 is connected to the sides 2a of the truck by means of respective known control devices 14 which are suitable to detect the movements of said frame 11. Said control devices 14 are rigidly coupled to the truck by means of appropriate elastic means.

The actuation means 10 have flexible transmission means 15 which, on a horizontal plane, wind around a plurality of toothed wheels 16, at least one of which can be actuated by motor elements which are not shown. Pairs of rods 17 for the coupling of the bumpers 8 are rigidly coupled, along parallel arms which are transverse with respect to the truck, to said transmission means 15, which are for example of the chain type.

The rods 17 pass through the sides 2a at holes 18 which are wide enough to allow said strokes of the frame 11.

In practice, the truck 1 is arranged below the load to be lifted in the configuration in which the bumpers 8 are adjacent to the sides 2a of the truck (FIG. 1).

By virtue of the actuation means 5, the container 7 is then lifted to a height sufficient to allow the movement of the bumpers 8 into the transport position, which is spaced from the sides 2a of the truck, without interfering with the feet 7a of the container. The mutual spacing movement of the bumpers 8 is actuated by means of the flexible transmission 15, which is moved in the direction indicated by an arrow A (FIG. 2).

Once the extraction of the bumpers 8 is completed, it is possible to partially lower the load, so as to keep the feet 7a slightly raised from the ground. In the transport position, the feet 7a are in any case arranged inside the perimeter defined by the bumpers 8.

It is furthermore possible to provide recesses 19 on the bumpers 8 at the feet 7a of the container, as shown in FIG. 3, which is also a partial view of the previously described solution. This allows to extract the bumpers 8 while limiting the lifting of the container 7, without interfering with its feet 7a.

In case of collision against an obstacle, the bumpers 8 transmit a corresponding stress to the frame 11, which is free to move longitudinally and transversely with respect to the truck to a limited extent. This movement is detected by the control devices 14, which actuate conventional stop and/or alarm means of the truck. Since the bumpers 8, with the end portions 9, completely surround the truck 1, said truck is sensitive to collisions on all sides, thus providing the maximum safety condition.

Figure 4:
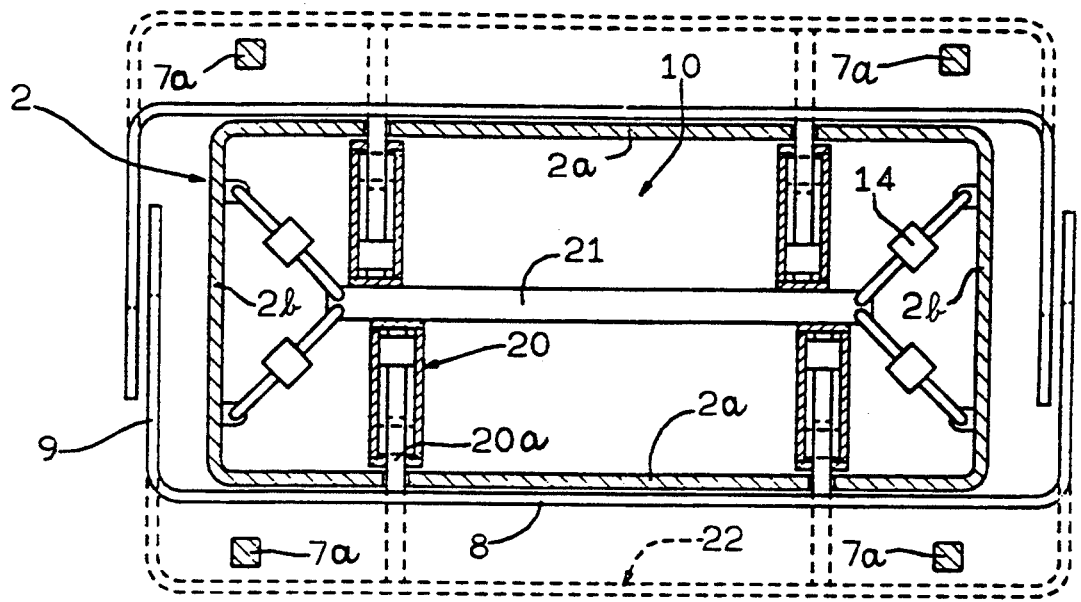
FIG. 4 is a horizontal sectional view of the truck, showing a different embodiment of the safety device of FIG. 1.

In the solution illustrated in FIG. 4, which is functionally fully similar to the preceding one, the bumpers 8 are extracted by virtue of actuation means 10 which are constituted by reciprocating actuators 20, for example fluid-activated cylinders, rigidly coupled to a central frame or beam 21; the stems 20a of said cylinders constitute the coupling rods of the bumpers 8. The broken line 22 indicates the extracted position assumed by the bumpers 8 during transport.

The central beam 21 is rigidly coupled to the truck, at its opposite ends, by means of pairs of control devices 14 which are arranged so as to define a triangle together with the end walls 2b of said truck.

Figure 5:
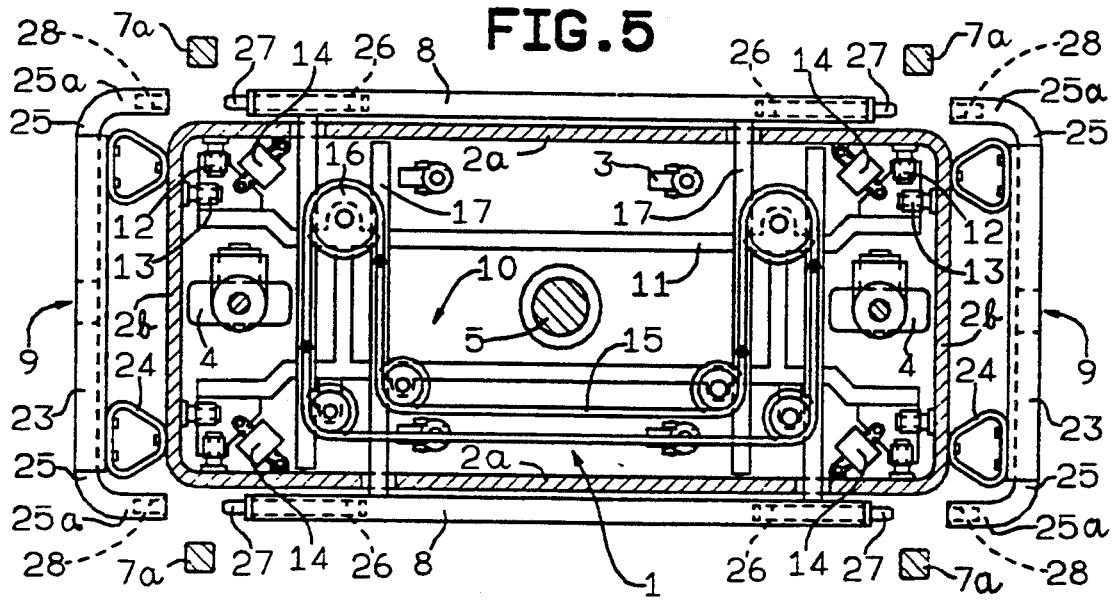
FIGS. 5 and 6 are corresponding horizontal sectional views of a truck equipped with a safety device provided in a different embodiment, respectively in the loading position and in the transport position.
Figure 6:
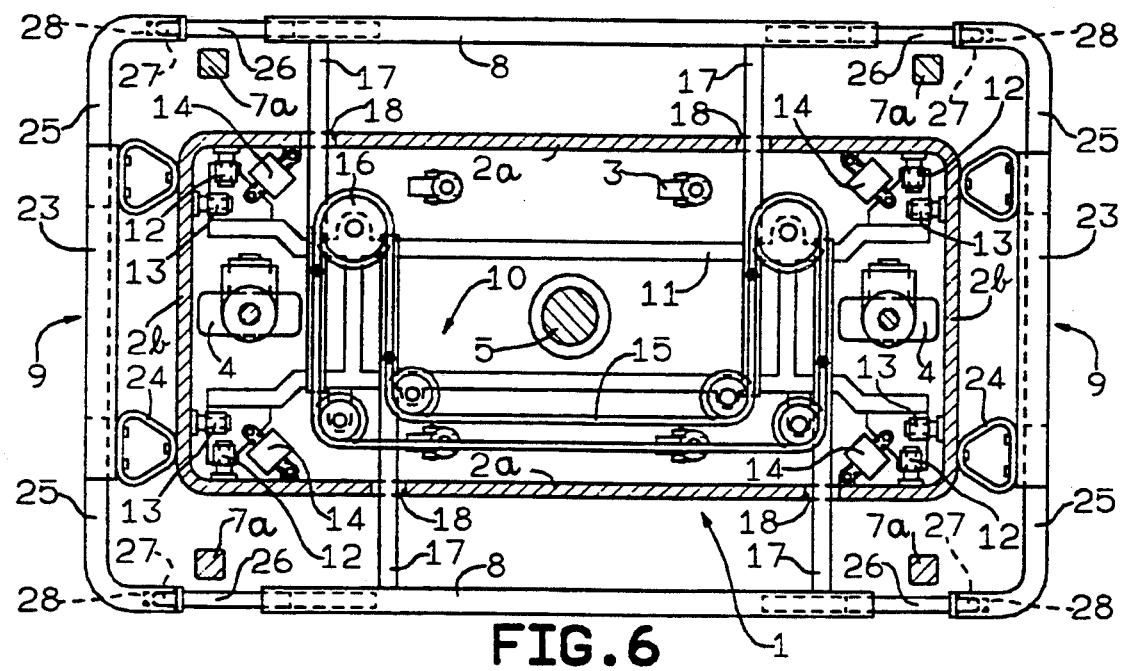
Figure 7:
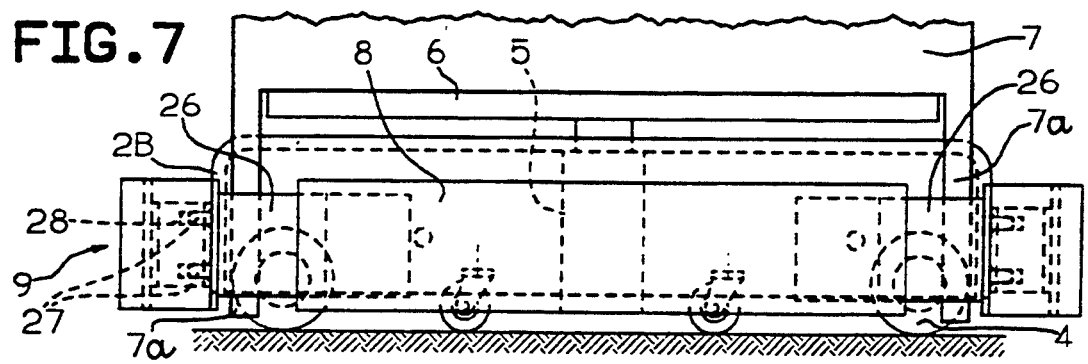
FIG. 7 is a side view of the truck shown in FIGS. 5 and 6.

The safety device illustrated in FIGS. 5, 6, and 7 has lateral protection elements 8 constituted by bumpers whose longitudinal extension is slightly shorter than the length of the truck.

The safety device is furthermore provided with end protection elements, again generally designated by the numeral 9 for the sake of clarity. The end protection elements 9 are constituted by a pair of bumpers 23, respectively a front one and a rear one, which are rigidly coupled, by elastically deformable couplings 24, to the end walls 2b of the truck. The end bumpers 23 are provided with telescopic wings 25 which are symmetrically extractable at the opposite ends of said bumpers. The wings 25 have their respective terminal parts 25a directed backward.

The lateral bumpers 8 are in turn provided with telescopic wings 26 which are symmetrically extractable at their ends and are provided with engagement elements 27 which couple to corresponding seats 28 defined in the terminal parts 25a of the telescopic wings 25 of the end bumpers 23.

The translatory motion of the lateral bumpers 8 between the loading position and the transport position is determined by actuation means 10 provided with flexible transmission means 15 similar to those previously described.

The truck 1 is arranged below the load to be lifted, in the configuration in which the lateral bumpers 8 are arranged adjacent to the sides 2a and the telescopic wings 25 and 26 are retained inside the bumpers 23 and 8 respectively (FIG. 5).

The symmetrical extraction of the lateral bumpers 8 and of the telescopic wings 25 of the end bumpers 23 is then performed. It is stressed that this extraction is not hindered by the feet 7a of the container 7 to be loaded, by virtue of the openings defined between the opposite margins of the lateral bumpers 8 and of the telescopic wings 25 of the end bumpers 23. After the extraction of the lateral bumpers 8, the telescopic wings 25, and the end bumpers 23, the symmetrical extraction of the telescopic wings 26 of the lateral bumpers 8 is actuated, and said wings engage the corresponding wings 25 of the end bumpers 23 (FIG. 6).

The substantial continuity of the protection elements 8 and 9 is thus provided, so that the truck 1 is sensitive to collisions on all sides. For transport, the container 7 is raised so as to keep the feet 7a slightly raised from the ground (FIG. 7).

Figure 8:
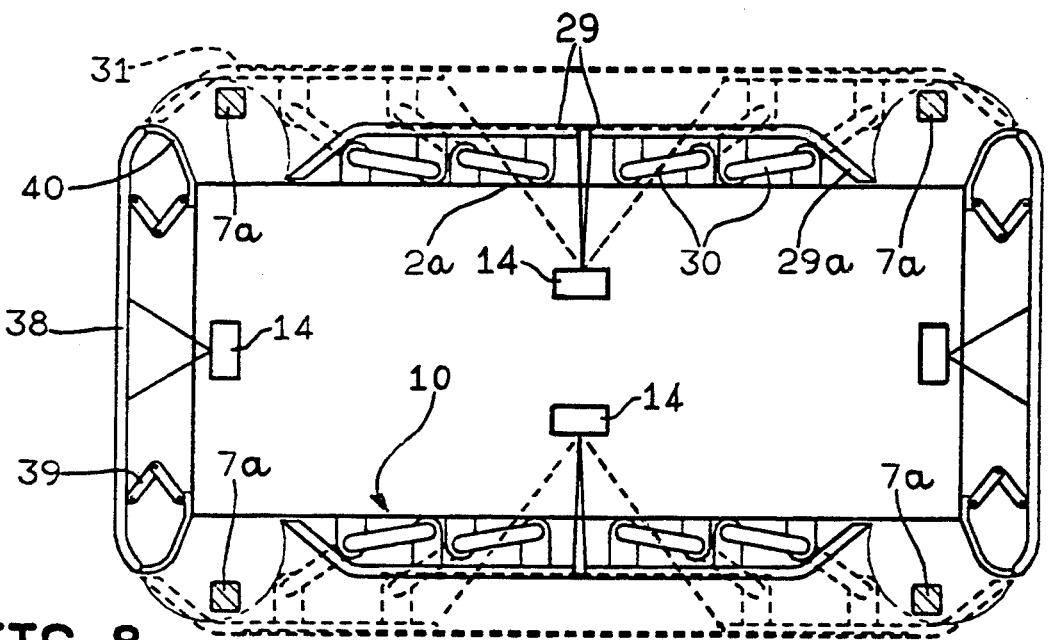
FIG. 8 is a horizontal sectional view of the truck, showing a further embodiment of the safety device.
Figure 9:
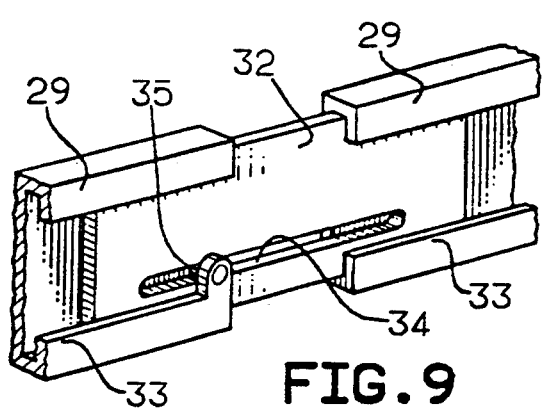
FIGS. 9 and 10 are enlarged perspective views of a detail of the safety device illustrated in FIG. 8.
Figure 10:
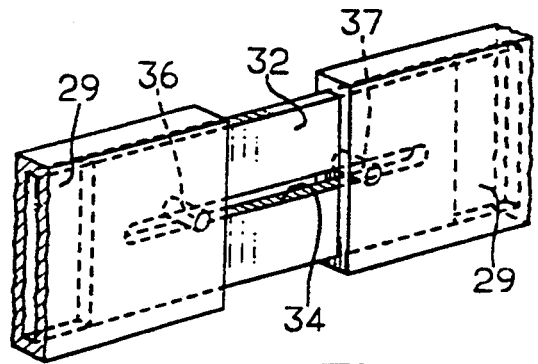

Finally, in the solution shown in FIGS. 8, 9, and 10, the lateral protection elements comprise end portions which are constituted by pairs of bumpers 29 which are articulated symmetrically by virtue of connecting-rod means 30 on the sides 2a of the truck. Actuation means 10, of which said connecting rods 30 are part, produce the translatory motion of the bumpers 29 from a loading position, in which they are adjacent to the sides 2a of said truck, to a transport position, indicated by the broken line 31, in which they are spaced from the truck.

Each pair of lateral bumpers 29 supports, in a median position, a sliding wall 32 which maintains continuity of the protection when said bumpers 29 move mutually apart, moving into the transport position 31.

As can be seen in the enlarged detail view of FIG. 9, the sliding wall 32 is conveniently guided by profiled edges 33 of the bumpers 29 and has a longitudinal slot 34 which is engaged by a pin 35 which protrudes transversely from one of said bumpers, so as to prevent said wall from leaving the guides. In the case shown in FIG. 10, the wall 32 can instead slide in box-like bumpers 29 and is provided with a slot 34 extending symmetrically therealong which is engaged by a pair of pins 36 and 37 which respectively pass through the bumpers 29.

The end protection elements are instead constituted by bumpers 38 which are symmetrically articulated, by means of pairs of lever systems 39, to the end walls of the truck. The ends of the bumpers 38 are rigidly coupled to the truck by virtue of respective elastic means 40 which act so as to contrast any collisions on said bumpers.

It should be noted that the outer ends of the lateral bumpers 29 have folded portions 29a which, in the transport position, are meant to close against the opposite ends of the end bumpers 38, so as to establish the continuity of the shock-absorbing protection.

The angular rotation for the extraction of the lateral bumpers 29 produces a circular path of said folded portions 29a, so as to move around the feet 7a of the container 7 to be lifted, without producing mutual interferences whereby comprising said fleet within an area completely enclosed by the protection elements.

Naturally, the lateral bumpers 29 and the end bumpers 38 are connected to appropriate control devices 14 which are meant to detect any collisions.

In practice, the materials employed, as well as the shapes and dimensions, may be any according to the requirements, without thereby abandoning the scope of the protection of the following claims.

We claim:

1. Shock-absorbing safety device, particularly for a self-propelled truck, comprising lateral protection elements which extend along sides of the truck; actuation means for moving said lateral protection elements transversely with respect to said truck between a loading position whereat said lateral protection elements are arranged adjacent to the sides of the truck and a transport position whereat said lateral protection elements are appropriately spaced therefrom; end protection elements for providing, in said transport position, substantial continuity with said lateral protection elements; and control means for detecting any collisions transmitted by said lateral protection elements and said end protection elements, wherein said lateral protection elements are provided with respective pairs of bumpers articulated symmetrically by connecting-rod means, on the sides of said truck, said lateral protection elements being provided in a median position thereof, with a sliding wall for maintaining continuity of protection when the bumpers are mutually spaced for moving into said transport position, and outer ends of said lateral protection elements have folded portions which, in said transport position, close against opposite ends of said end protection elements, said end protection elements being symmetrically articulated to said truck by means of lever systems and rigidly coupled to said truck by elastic means.

2. Device according to claim 1, wherein said sliding wall is guided by profiled edges of said bumpers and comprises a longitudinal slot, said slot being engaged by a pin which protrudes transversally from one of said bumpers.

3. Device according to claim 1, wherein said sliding wall is slidable in said bumpers which have a box-like configuration, said slidable wall being provided with a slot extending symmetrically therealong, said slot being engaged by a pair of pins passing respectively through said bumpers.

4. Shock-absorbing safety device, particularly for a self-propelled truck, comprising lateral protection elements which extend along sides of the truck; actuation means for moving said lateral protection elements transversely with respect to said truck between a loading position whereat said lateral protection elements are arranged adjacent to the sides of the truck and a transport position whereat said lateral protection elements are appropriately spaced therefrom; end protection elements for providing, in said transport position, substantial continuity with said lateral protection elements; and control means for detecting any collisions transmitted by said lateral protection elements and said end protection elements, wherein said lateral protection elements comprise end portions being movable between a configuration corresponding to said loading position and an extracted configuration corresponding to said transport position whereby, upon movement of said lateral protection elements in said transport position, outer ends of said end portions are moved along a circular path for not interfering with downward feet of a container loaded on said truck while in said loading position, said end portions being adapted to close against opposite ends of said end protection elements for forming a substantially continuous protection element around said truck while in said transport position, thence the downward feet of the container being comprised within an area completely enclosed by said protection elements.

5. Device according to claim 4, wherein said end portions are constituted by respective pairs of bumpers articulated symmetrically by connecting-rod means, on the sides of said truck, said lateral protection elements being provided in a median position thereof, with a sliding wall for maintaining continuity of protection when the bumpers are mutually spaced for moving into said transport position.

6. Device according to claim 5, wherein outer ends of said lateral bumpers have folded portions which, in said transport position, close against opposite ends of said end protection elements, which are symmetrically articulated to said truck by means of lever systems and are rigidly coupled to said truck by elastic means.

7. Device according to claim 5, wherein said sliding wall is guided by profiled edges of said bumpers and comprises a longitudinal slot, said slot being engaged by a pin which protrudes transversally from one of said bumpers.

8. Device according to claim 5, wherein said sliding wall is slidable in said bumpers which have a box-like configuration, said slidable wall being provided with a slot extending symmetrically therealong, said slot being engaged by a pair of pins passing respectively through said bumpers.

9. Shock-absorbing safety device, particularly for a self-propelled truck, comprising lateral protection elements which extend along sides of the truck; actuation means for moving said lateral protection elements transversely with respect to said truck between a loading position whereat said lateral protection elements are arranged adjacent to the sides of the truck and a transport position whereat said lateral protection elements are appropriately spaced therefrom; end protection elements for providing, in said transport position, substantial continuity with said lateral protection elements; and control means for detecting any collisions transmitted by said lateral protection elements and said end protection elements, wherein said lateral protection elements comprise end portions being movable between a retracted configuration corresponding to said loading position and an extended configuration corresponding to said transport position whereby, upon movement of said lateral protection elements in said transport position, said end portions are adapted to close against opposite ends of said end protection elements for forming a substantially continuous protection element around said truck.

10. Device according to claim 9, wherein said end portions are constituted by respective pairs of bumpers articulated symmetrically by connecting-rod means, on the sides of said truck, said lateral protection elements being provided in a median position thereof, with a sliding wall for maintaining continuity of protection when the bumpers are mutually spaced for moving into said transport position.

11. Device according to claim 10, wherein outer ends of said lateral bumpers have folded portions which, in said transport position, close against opposite ends of said end protection elements, which are symmetrically articulated to said truck by means of lever systems and are rigidly coupled to said truck by elastic means.

12. Device according to claim 10, wherein said sliding wall is guided by profiled edges of said bumpers and comprises a longitudinal slot, said slot being engaged by a pin which protrudes transversally from one of said bumpers.

13. Device according to claim 10, wherein said sliding wall is slidable in said bumpers which have a box-like configuration, said slidable wall being provided with a slot extending symmetrically therealong, said slot being engaged by a pair of pins passing respectively through said bumpers.

* * * * *